(12) United States Patent
Kai et al.

(10) Patent No.: US 6,567,618 B2
(45) Date of Patent: May 20, 2003

(54) CAMERA

(75) Inventors: Tadao Kai, Kawasaki (JP); Masaru Habe, Kawasaki (JP); Akio Nishizawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/911,400

(22) Filed: Jul. 25, 2001

(65) Prior Publication Data

US 2002/0015593 A1 Feb. 7, 2002

(30) Foreign Application Priority Data

Jul. 27, 2000 (JP) ........................................ 2000-226453

(51) Int. Cl.⁷ ........................... G03B 17/00; G03B 17/02
(52) U.S. Cl. ........................................ 396/299; 396/540
(58) Field of Search .......................... 396/59, 299, 502, 396/540, 535, 543

(56) References Cited

U.S. PATENT DOCUMENTS 5,270,761 A * 12/1993 Kwak .......................... 396/540
5,408,287 A * 4/1995 Windegarden et al. ...... 396/502
5,528,337 A * 6/1996 Kawano ....................... 396/502

* cited by examiner

*Primary Examiner*—David M. Gray
*Assistant Examiner*—Rochelle Blackman
(74) *Attorney, Agent, or Firm*—Oliff & Berridge, PLC

(57) ABSTRACT

A camera body has grip portions for right-handed users and the left-handed users provided respectively on the right and left sides thereof. A release button to be operated by the right hand is mounted on the side of the grip portion for right-handed users, and a release button to be operated by the left hand is mounted on the side of the grip portion for left-handed users. A ring member is rotatably mounted about a lens-barrel. When the ring member is rotated toward the release button for right-handed users, the release button for right-handed users is enabled, and when it is rotated toward the release button for left-handed users, the release button for left-handed users is enabled.

21 Claims, 7 Drawing Sheets

CAMERA

BACKGROUND OF THE INVENTION

1. Field of the Invention

The present invention relates to a camera using silver halide film or an electronic camera, and more specifically, to a camera that allows the user to make photographing operation by either hand.

2. Description of the Related Art

Hitherto, the prevalent cameras are so designed that the camera body is held by the right hand, and the main operating switches including a release button are operated also by the right hand. There are also provided left-handed cameras that can be operated only by the left hand. Each type of camera is designed so as to be operated by corresponding one of the right and left hands.

However, the operability of these conventional cameras is not good when the right-handed camera is held by the left hand or when the left-handed camera is held by the right hand, and thus they are inconvenient for single hand use. In the case of the right-handed camera, for example, when the right-handed person who is shooting video with a video camera held by his/her right hand wants to take a picture by a still camera, he/she has to operate the still camera only by his/her left hand, and it is not easy to operate the still camera. For the left-handed person or the person who cannot use his/her right hand freely, the right-handed camera is inconvenient to operate.

SUMMARY OF THE INVENTION

Accordingly, it is an object of the present invention to provide a one-handed camera that can easily be operated by either hand without probability of wrong operation.

The camera according to the present invention comprises a grip portion for left-handed users and a grip portion for right-handed users provided on the left side and right side respectively, an operating member for right-handed users to be operated while the grip portion for right-handed users is being gripped, an operating member for left-handed users to be operated while the grip portion for left-handed users is being gripped, and a switching mechanism for selectively enabling the operating member for right-handed users and the operating member for left-handed users.

The switching mechanism may include a switching operation member that is operated in the opposing first and second directions. When the switching operation member is operated in the first direction, the operating member for right-handed users is enabled, and when the switching operation member is operated in the second direction, the operating member for left-handed users is enabled. It is preferred that the first direction is the direction toward the operating member for right-handed users and the second direction is the direction toward the operating member for left-handed users.

Prohibiting means may be provided for prohibiting the operation of one of the operating members for right-handed users and for left-handed users, which is not selected, in conjunction with the switching operation of the switching operation member. As prohibiting means, a blocking member may be employed that mechanically prevents or resists the operation of the operating member. In this case, the blocking member disables the operating member for left-handed users when the switching operation member is operated in the first direction, and disables the operating member for right-handed users when the switching operation member is operated in the second direction.

If a ring member mounted so as to rotate about the lens-barrel is employed as a switching operation member, the blocking member may be provided integrally with the ring member. The blocking member may be adapted to cover the operating member for left-handed users when the switching operation member is operated in the first direction, and to cover the operating member for right-handed users when the switching operation member is operated in the second direction.

The prohibiting means may be adapted to electrically disable either of the operating members. In this case, the prohibiting means may include a power switch that is interlocked with the switching operation member. If the operating member for right-handed users is operated under the situation where the switching operation member has been operated in the first direction, the power switch takes the first state to output the electrical signals corresponding to the operation of the operating member for right-handed users, and prohibits the output of any electrical signal corresponding to the operation of the operating member for left-handed users. On the contrary, if the operating member for left-handed users is operated under the situation where the switching operation member has been operated in the second direction, the power switch takes the second state to output the electrical signals corresponding to the operation of the operating member for left-handed users and prohibit the output of any electrical signal corresponding to the operation of the operating member for right-handed users. In this case as well, it is preferable that the first direction is the direction toward the operating member for right-handed users and the second direction is the direction toward the operating member for left-handed users.

A flash unit may be provided on the switching operation member. The flash unit is moved toward the operating member for left-handed users when the switching operation member is operated in the first direction, and is moved toward the operating member for right-handed users when the switching operation member is operated in the second direction.

If a view finder is mounted between the operating members for right-handed users and for left-handed users, the same operating feeling can be obtained both for the operations by the left hand and by the right hand. By arranging the heavy parts such as battery, capacitor, motor, and the like at the center in the camera body, the weight balance when the camera is held is improved both in the right hand and left hand operations.

DESCRIPTION OF THE PREFERRED EMBODIMENTS

First Embodiment

Figure 1A:
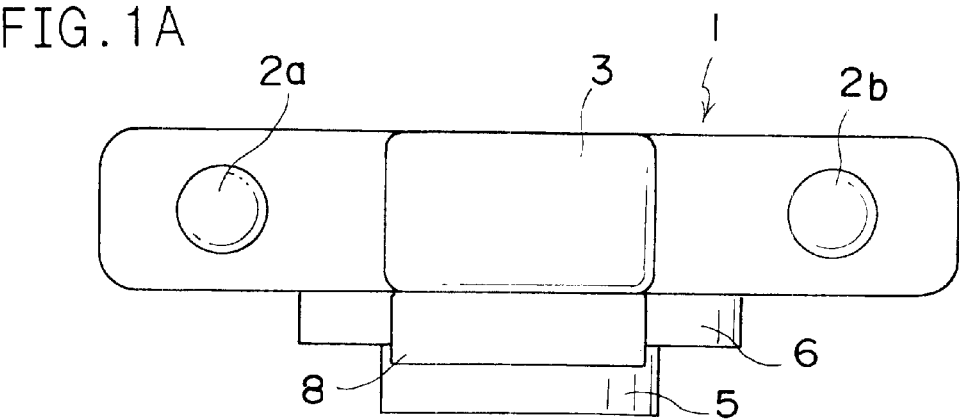
FIG. 1A is a plan view showing the first embodiment of the camera according to the present invention.

FIGS. 1A, 1B and FIGS. 2A, 2B show the first embodiment of the camera according to the present invention. The camera is provided with a grip portion 4a for right-handed users and a grip portion 4b for left-handed users on the right and left sides of the front of the camera body respectively. The camera is provided with two release buttons 2a, 2b and a finder 3 on the upper surface thereof. The release button 2a provided on the left side as viewed in the figures is a release button for right-handed users to be operated when the grip portion 4a for right-handed users is gripped by the right hand. The release button 2b provided on the right side as viewed in the figures is a release button for left-handed users to be operated when the grip portion 4b for left-handed users is gripped by the left hand.

The camera has a taking lens-barrel 5, which is provided with a ring member 6 so as to surround the base portion of the barrel 5 and to rotate with respect to the barrel 5. The ring member 6 is fixed with a lever 7 at the lower portion thereof so as to project radially outwardly from the ring member 6. By operating the lever 7 in the left and right directions as shown in the figures, the ring member 6 may be rotated by an angle (±α) from the state shown in FIG. 1B. The lever 7 serves as an operating element for opening and closing a lens barrier 9 incorporated in the barrel 5 and an operating element for a main switch of the camera 1. The lever also serves as an operating element for a changeover switch 21 (See FIG. 2B) that selectively enables either of the release buttons 2a and 2b.

Figure 1B:
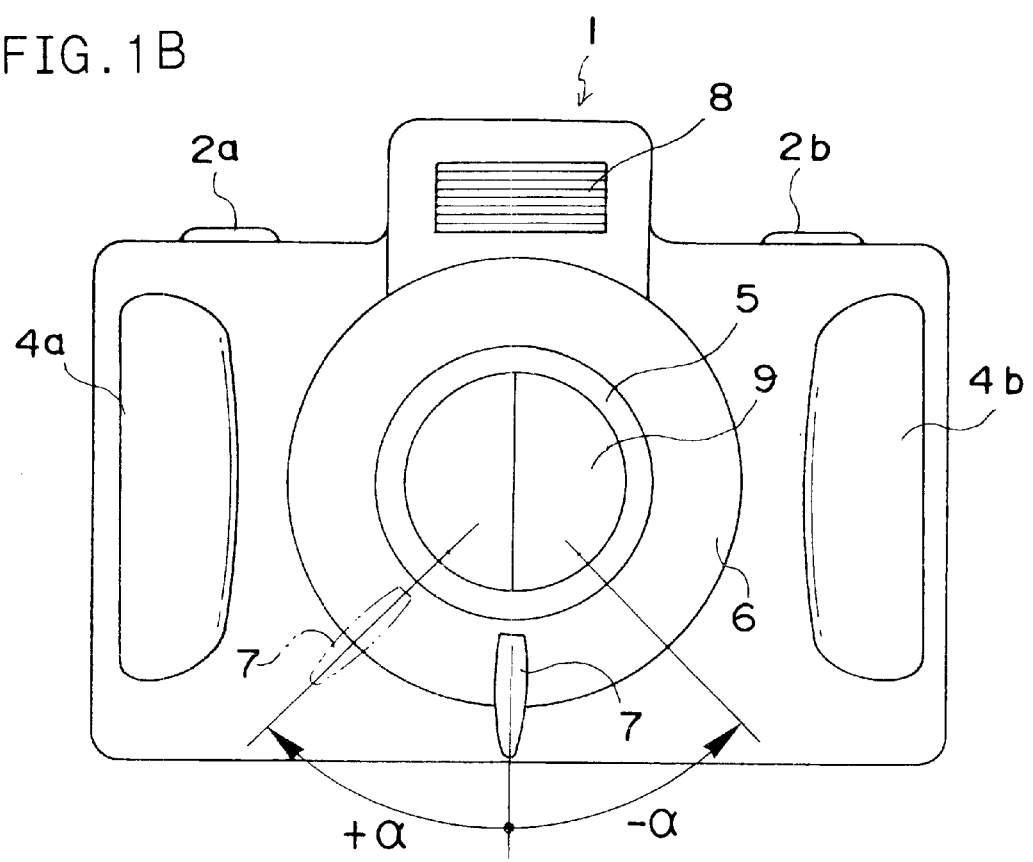
FIG. 1B is a front view of the camera shown in FIG. 1A.
Figure 2A:
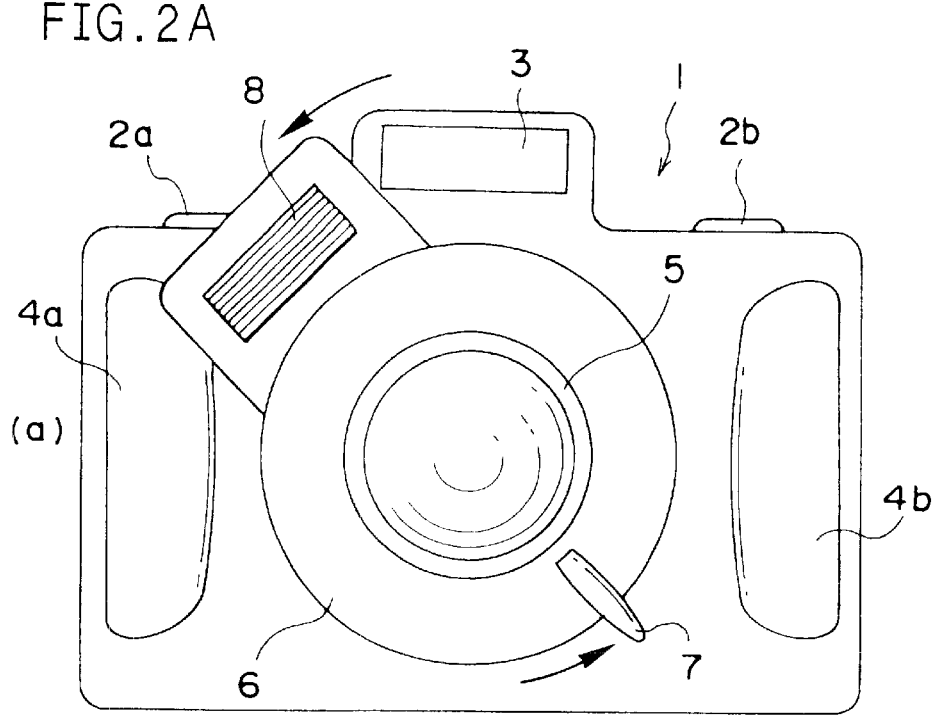
FIG. 2A is an explanatory front view showing the operation of the lever in the camera according to the first embodiment.

When the lever 7 is in the normal position shown in FIG. 1B, a power switch 51 (See FIG. 2B) of the camera 1 is in the OFF state, and the lens barrier 9 is in the closed state. When the lever 7 is operated from the above normal position so that the ring member 6 is rotated by ±α, the power switch 51 is turned ON and the lens barrier 9 is brought to the open state. When the lever 7 is rotated by an angle of ±α toward the grip portion 4a for right-handed users, the release button 2a for right-handed users is enabled. On the other hand, when the lever 7 is rotated by an angle of −α toward the grip portion 4b for left-handed users as shown in FIG. 2A, the release button 2b for left-handed users is enabled. The power switch 51 of the camera 1 is turned ON whenever the lever 7 is turned in either direction by an angle of +α or −α.

The ring member 6 is fixed with a flash unit 8 on the upper portion thereof. The flash unit 8 is disposed in front of the finder 3 so as to overlap thereon when the level 7 is in the normal position and the power switch 51 is in the OFF state. As shown in FIG. 2A, when the lever 7 is operated toward the grip portion 4b for left-handed users and the ring member 6 is rotated by an angle of −α, the flash unit 8 is moved by the ring member 6 toward the grip portion 4a for right-handed users. As a consequent, the finder 3 that was covered by the flash unit 8 appears and thus observation through the finder is enabled. In contrast to it, when the lever 7 is operated toward the grip portion 4a for right-handed users, the flash unit 8 is moved toward the grip portion 4b for left-handed users on the opposite side and the finder 3 appears.

Figure 2B:
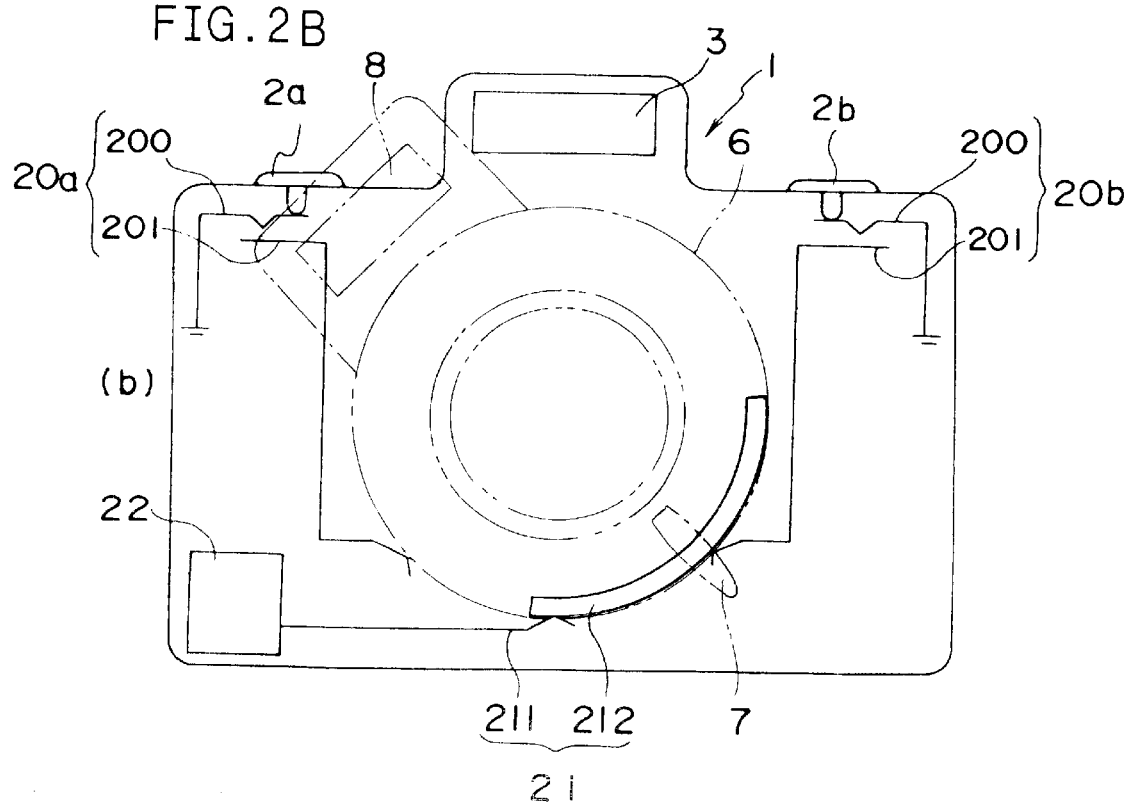
FIG. 2B is an explanatory drawing showing the switching operation of the release buttons in the camera according to the first embodiment.

FIG. 2B is an explanatory drawing showing the switching operation of the release buttons 2a, 2b by moving the lever 7. In FIG. 2B, the ring member 6, the lever 7, and the flash unit 8 are shown by the dotted lines. The reference numerals 20a and 20b designate the release switch for switching between ON and OFF by the operation of the release buttons 2a, 2b, respectively. Each release switch 20a, 20b is provided with a movable contact strip 200 and a fixed contact strip 201. When neither of the release buttons 2a, 2b is operated, the contact strips 200 and 201 are not in contact with each other as shown in FIG. 2B, and the release switches 20a, 20b are left in the OFF state. On the other hand, when either of the release buttons 2a, 2b is pressed in, the associated movable contact strip 200 warps and comes into contact with the corresponding fixed contact strip 201 and the associated release switch 20a or 20b is turned into the ON state.

The above mentioned changeover switch 21 comprises a fixed contact strip 211 connected to a control circuit 22 of the camera, and a movable contact strip 212 that is adapted to rotate together with the ring member 6 and the lever 7 while keeping in contact with the fixed contact strip 211. In this embodiment, when the lever 7 is at the central position as shown in FIG. 1B, the movable contact strip 212 of the changeover switch 21 is kept in contact with both the fixed contact strips 201 of the release switches 20a, 20b. However, when the lever 7 is at the central position, the power switch 51 is in the OFF state as described above, and thus the camera is not activated even when either of the release switches 20a, 20b is turned into the ON state by operating the associated release button 2a or 2b. In other words, the release signal is not issued.

As shown in FIGS. 2A and 2B, when the lever 7 is operated toward the grip portion 4b for left-handed users, the power switch 51 of the camera 1 is turned ON, the movable contact strip 212 of the changeover switch 21 rotate integrally with the ring member 6, and the contact strips 212 and 201 of the release switch 20a are brought out of contact with each other. As a consequent, only the fixed contact strip 201 of the release switch 20b are kept in connection with the control circuit 22, whereby the release button 2b for left-handed users is enabled and the release button 2a for right-handed users is disabled. In contrast to it, when the lever 7 is operated toward the grip portion 4a for right-handed users, the movable contact strip 212 of the changeover switch 21 moves away from the fixed contact strip 201 of the release switch 20b and brought into contact with only the fixed contact strip 201 of the release switch 20a. As a consequent, the fixed contact strip 201 of the release switch 20a and the control circuit 22 are brought into conduction and only the release button 2a for right-handed users is enabled.

Figure 3A:
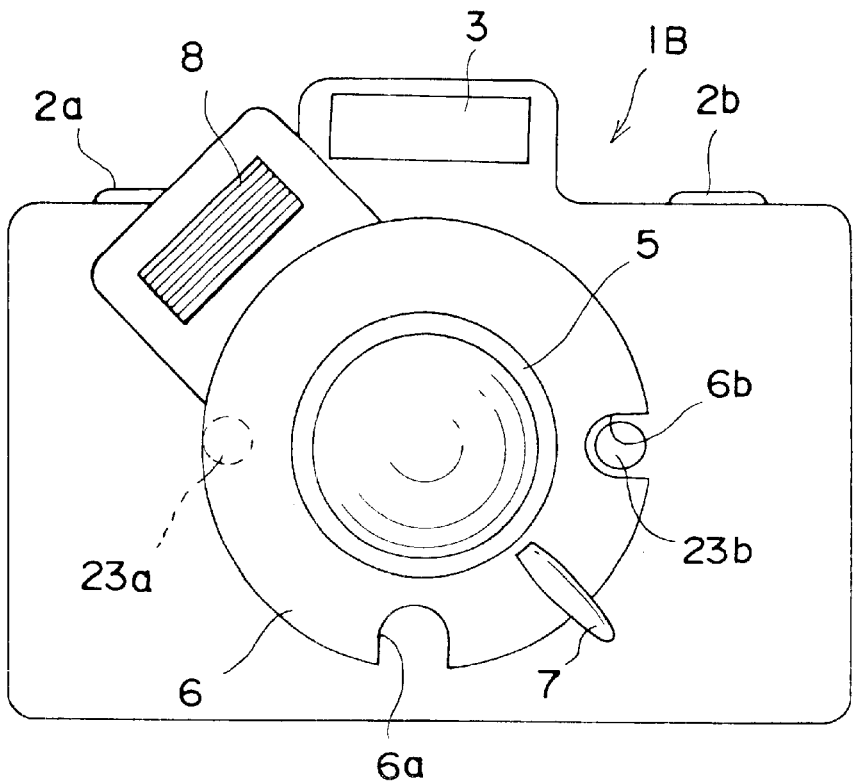
FIG. 3A is a front view showing a modification of the camera according to the first embodiment.

FIG. 3A shows a modification of the first embodiment. In FIG. 3A, the camera body is provided on the side opposed to the rear surface of the ring member 6 with a forced light emitting switches 23a, 23b for forcing the flash unit 8 to emit light. The forced light emitting switch 23a is to be used by the right hand, whereas the forced light emitting switch 23b is to be used by the left hand. The ring member 6 has on its periphery two notches 6a, 6b formed symmetrically about the lever 7. As shown in FIG. 3A, when the lever 7 is moved toward the grip portion 4b for left-handed users, the notch 6b moves to the position of the forced light emitting switch 23b for left-handed users, and thus the operation of the switch 23b is enabled. At this time, the forced light emitting switch 23a for right-handed users cannot be operated since it is covered by the peripheral portion of the ring member 6. In contrast to it, when the lever 7 is operated toward the grip portion 4a for right-handed users, the notch 6a moves to the position of the forced light emitting switch 23a for right-handed users, and thus the forced light emitting switch 23b for left-handed users is covered by the peripheral portion of the ring member 6.

Figure 3B:
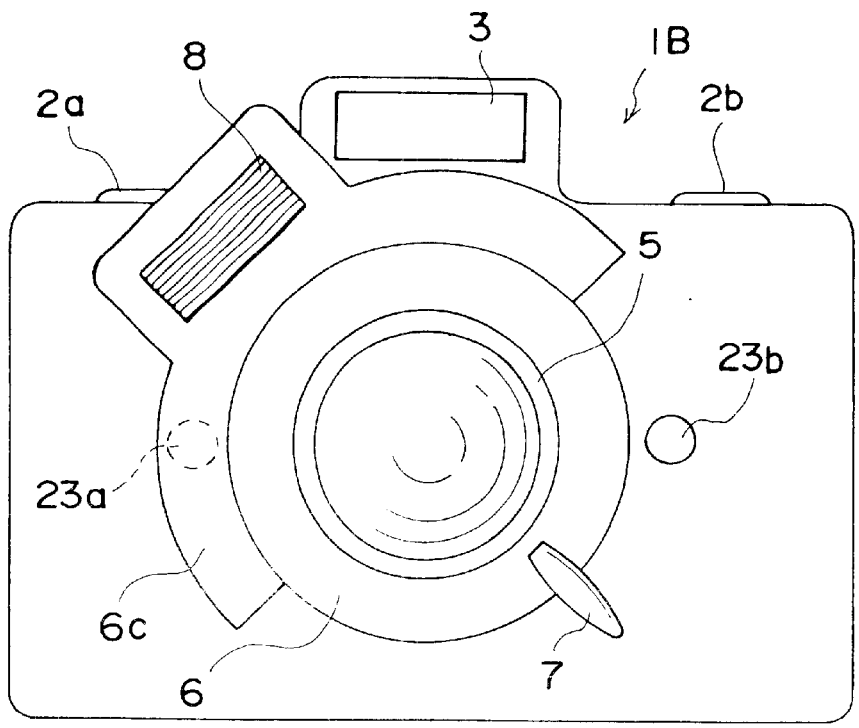
FIG. 3B is a front view showing another modification of the camera according to the first embodiment.

Although in the example shown in FIG. 3A, the notches 6a, 6b are formed on the periphery of the ring member 6, as shown in FIG. 3B, a overhanging portion 6c may be integrally formed with the upper peripheral portion of the ring member 6 so as to cover and uncover one and the other of the forced light emitting switches 23a and 23b, respectively, according to the rotational position of the ring member 6. It is to be noted that the forced light emitting switches 23a, 23b are located radially outside of the ring member 6. When the lever 7 is operated toward the grip 4b for left-handed users as shown in FIG. 3B, the forced light emitting switch 23a for right-handed users is covered by the overhanging portion 6c and thus only the forced light emitting switch 23b for left-handed users is enabled to be operated. In contrast to it, when the lever 7 is operated toward the grip portion 4a for right-handed users, the forced light emitting switch 23b for left-handed users is covered by the overhanging portion 6c and thus only the forced light emitting switch 23a for right-handed users is enabled to be operated.

In the camera 1B shown in FIGS. 3A and 3B, the operation for enabling/disabling the release buttons 2a, 2b is the same as that in the camera 1 shown in FIGS. 1A, 1B and FIGS. 2A, 2B. In other words, either one of the operating system for right-handed users (release button 2a, forced light emitting switch 23a) and the operating system for left-handed users (release button 2b, forced light emitting switch 23b) is enabled through the operation of the lever 7.

The camera 1 of the first embodiment comprises operating systems (release buttons 2a, 2b) respectively for right-handed and the left-handed users, and the camera 1B, which is a modification thereof, comprises operating systems (release buttons 2a, 2b and the forced light emitting switches 23a, 23b) respectively for right-handed and left-handed users. In these cameras, the operation of the lever 7 toward the grip portion 4a or 4b which is being gripped enables the operating system on the gripped side. As a consequent, the camera can usefully be gripped by either one of the left and right hands to take a picture.

In addition, the operation system on the side that is not gripped is disabled. For example, even if the release switch is closed by operating the release button on the side that is not gripped, the release signal is not supplied, thereby preventing wrong operation. The lever 7 can easily be operated by the hand that is gripping the grip portion 4a or 4b. Since the operating direction of the lever 7 and the operating system that is enabled are agreed with each other, the user can easily imagine the operating mode. In addition, the user can easily recognize which operating system is enabled based upon the position of the lever 7.

Second Embodiment

Figure 4A:
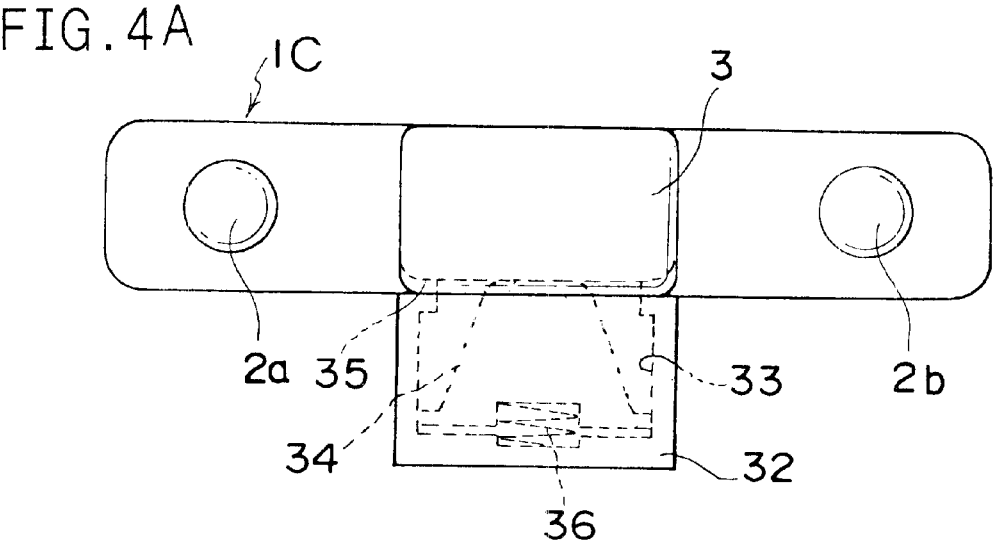
FIG. 4A is a plan view showing the second embodiment of the camera according to the present invention.
Figure 4B:
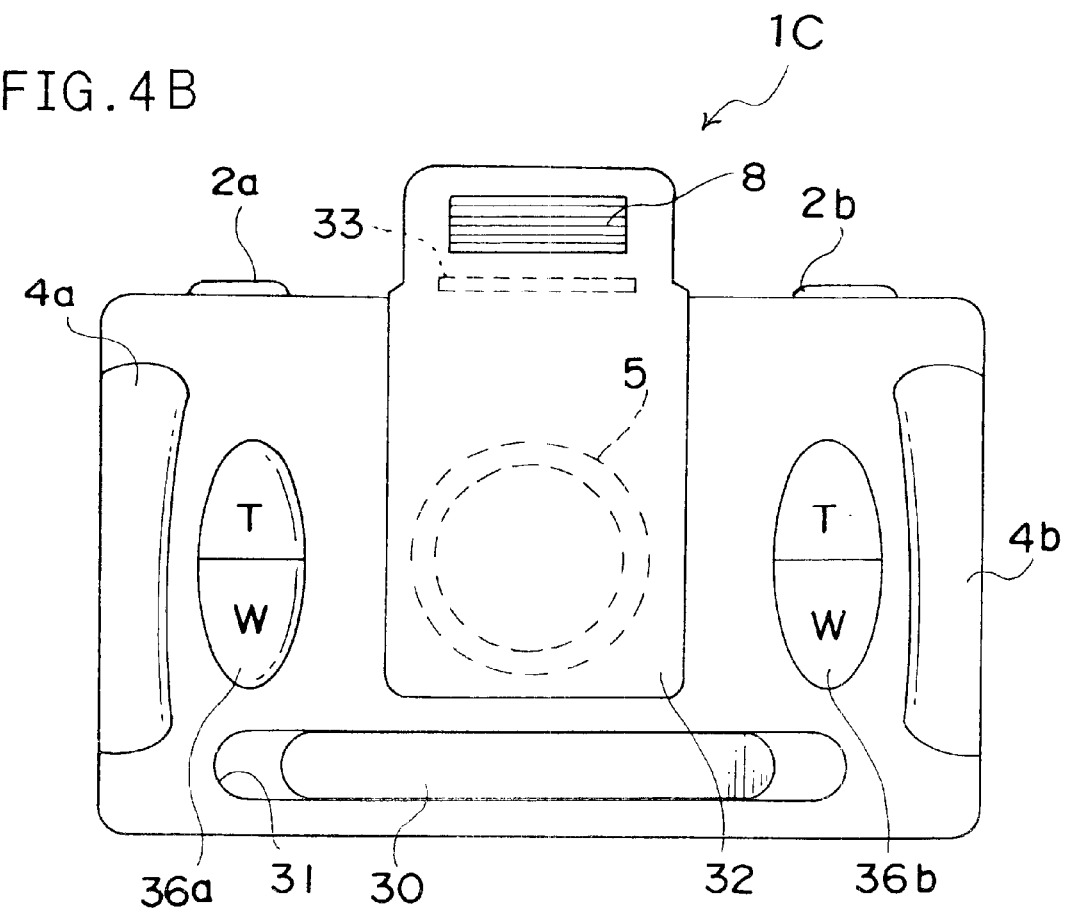
FIG. 4B is a front view of the camera shown in FIG. 4A.

FIGS. 4A, 4B and FIGS. 5A, 5B show the second embodiment of the camera according to the present invention. In FIGS. 4A and 4B, a sliding member 30 is provided in place of the lever 7 in the first embodiment. According to the sliding direction of the sliding member 30, the ON/OFF operation of the power switch 51 of the camera 1C and the enabling/disabling operation of the release buttons 2a, 2b and the zoom switches 36a, 36b as is described below are carried out.

The sliding member 30 is adapted to slide along the left and right directions in the figures along a groove 31 formed on the camera body. When it is positioned at the center as shown in FIG. 4B, the power switch 51 is in the OFF state. The flash unit 8 has a lens cover 32 formed integrally with the lower portion thereof. The lens cover 32 is formed with a void space 33 which is substantially rectangular in cross section. A cover plate 34 is stored in the space 33 so as to move in and out freely therein. The tip of the cover plate 34 engages with and is guided by a groove 35 (See FIG. 5A) formed on the front surface of the finder 3 and the cover plate 34 is urged by an urging member 36 such as a spring against the groove 35.

The lens cover 32 is so constructed that it is driven in response to the sliding movement of the sliding member 30 in the lateral direction opposite from the lateral operating direction of the sliding member 30. Although a drive mechanism for driving the lens cover is not shown in FIGS. 4A and 4B, a gear train or a motor interlocked with the sliding member 30, for example, maybe employed as the drive mechanism. When the sliding member 30 is positioned in the center as shown in FIG. 4B, the lens cover 32 is positioned at the center of the camera and covers the front surfaces of the taking lens-barrel 5 and the finder 3, and the power switch 51 is turned OFF.

Figure 5A:
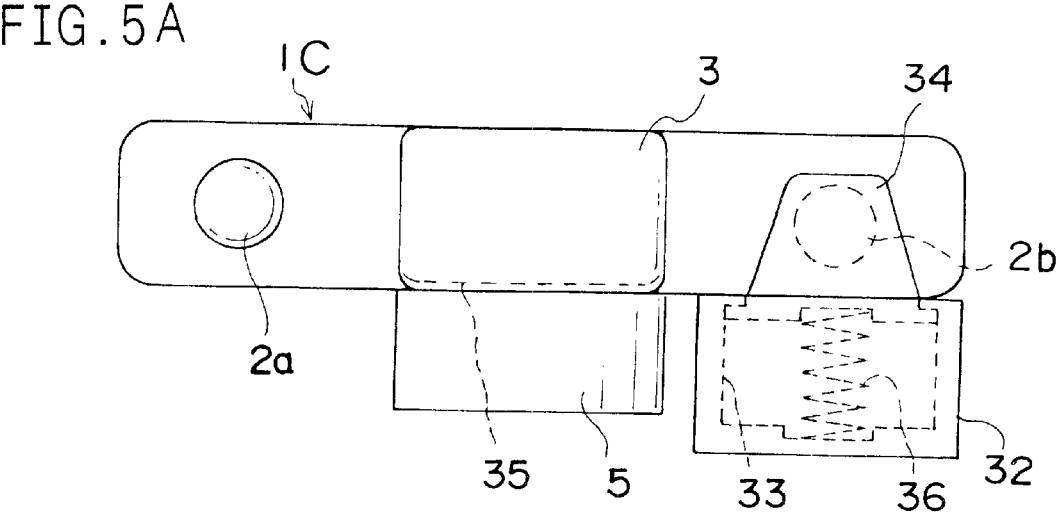
FIG. 5A is an explanatory plan view showing the switching operation by the sliding member in the camera according to the second embodiment.
Figure 5B:
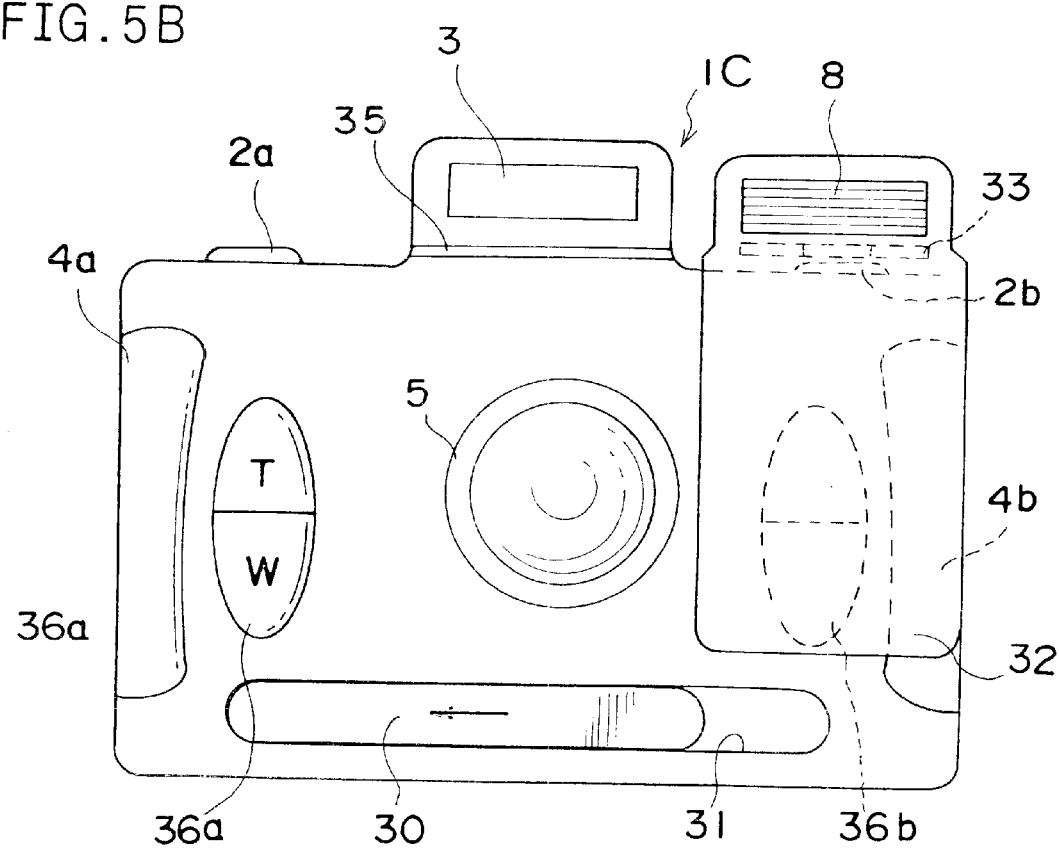
FIG. 5B is an explanatory front view showing the switching operation by the sliding member in the camera according to the second embodiment.

As shown in FIGS. 5A and 5B, when the sliding member 30 is moved to slide toward the grip portion 4a for right-handed users, the lens cover 32 is driven in the direction opposite from that of the sliding member 30, i.e., toward the grip portion 4b for left-handed users and, at the same time, the taking lens-barrel 5 is exposed. Since the cover plate 34 is urged rearward of the camera by the urging member 36, when the lens cover 32 is moved toward the grip portion 4b for left-handed users, the tip of the cover plate 34 comes off the groove 35 and the cover plate projects rearward. As a consequent, the zoom switch 36b and the release button 2b for left-handed users are covered by the lens cover 32 and the cover plate 34, respectively. In other words, the release button 2b and the zoom switch 36b for left-handed users are disabled while the release button 2a and the zoom switch 36a for right-handed users are enabled.

In contrast to it, when the sliding member 30 is moved to slide toward the grip portion 4b for left-handed users, the lens cover 32 is driven toward the grip portion 4a for right-handed users. As a consequent, the zoom switch 36a and the release button 2a for right-handed users are covered by the lens cover 32 and the cover plate 34 respectively, and the zoom switch 36b and the release button 2b for left-handed users are enabled.

In this embodiment, as like in the first embodiment, the operating system (release button 2a, zoom switch 36a) for right-handed users and the operating system (release button 2b, zoom switch 36b) for left-handed users are switched between the enabled state and the disabled state by the operation of the sliding member 30. In this case, by simply sliding the sliding member 30 toward the grip portion 4a or 4b which is being gripped, the operating system only on the gripped side is enabled. Therefore, wrong operation of the operating system on the side that is not gripped can surely be prevented. The sliding member 30 can easily be operated by the hand that is gripping the grip portion 4a or 4b. Since the sliding direction of the sliding member 30 and the operating system that is accordingly enabled are agreed with each other, the user can easily imagine the operating mode.

In the above described cameras according to the first and second embodiments, since the operating system corresponding to the gripped grip portion 4a or 4b is enabled, when the left-handed person holds the camera ready for taking a picture, the operating system for left-handed users is enabled, and while on the other hand, when the right-handed person holds the camera ready for taking a picture, the operating system for right-handed users is enabled. In the case where the user holds the came as opposed to takes his/her own picture, the user has to grip the grip portion 4a or 4b that is on the opposite side of the dominant hand by the other hand. However, by simply operating the lever 7 or the sliding member 30 toward the gripped side, the operating system on the gripped side can be enabled, thereby facilitating the operation for taking a picture.

In addition, in the cameras according to the first and second embodiments, since the finder is disposed at the center of the camera, the user can easily look into the finder no matter which grip, left or right, is gripped.

Although in the embodiments described thus far, the changeover of the operating system is effected by the operation of the lever 7 or the sliding member 30, touch sensors for the respective grip portions 4a and 4b may be utilized to detect which grip portion 4a or 4b is gripped, and only the operating system corresponding to the detected grip portion may be enabled.

Figure 6A:
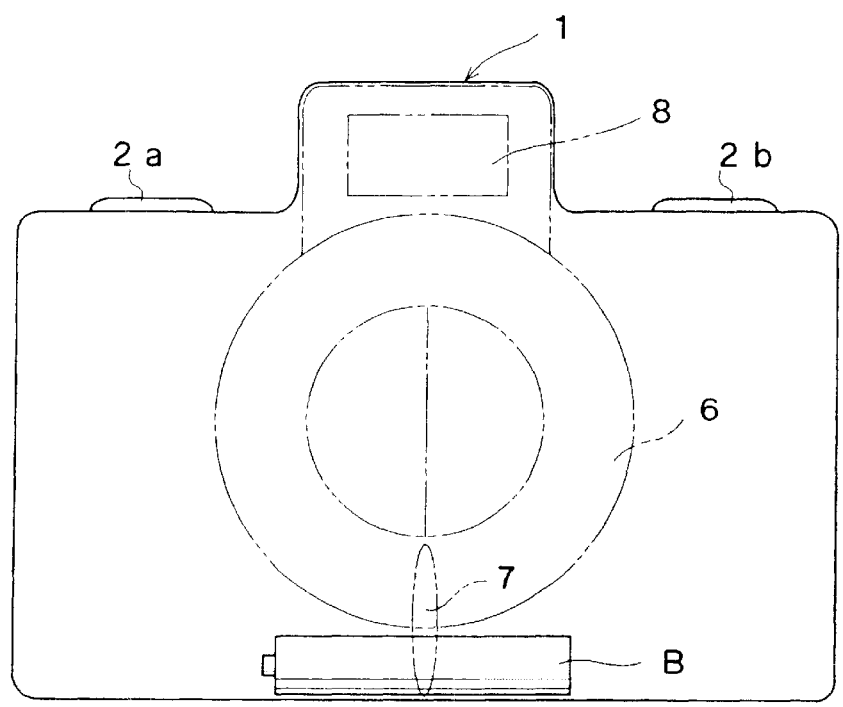
FIGS. 6A–6C are explanatory drawings of the camera in which the heavy part(s) is (are) disposed at the center in the camera body taking the weight balance into consideration.
Figure 6B:
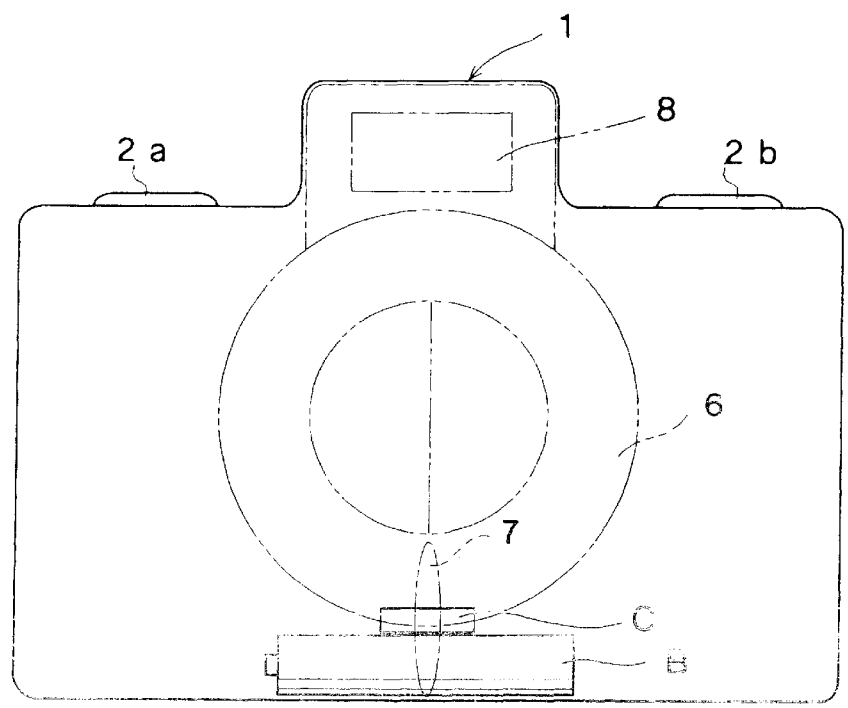
Figure 6C:
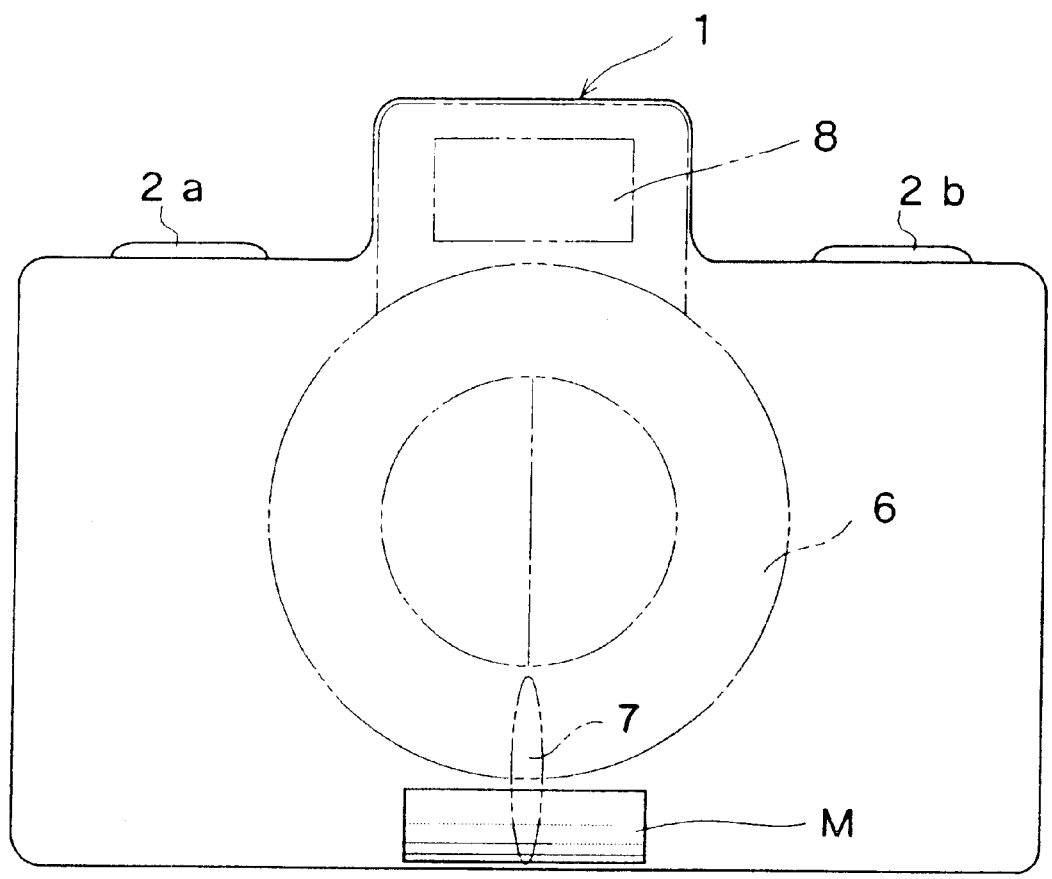

In the camera according to the present invention, it is preferable to give serious consideration to the weight balance of the camera to ensure the same feeling in spite of either grip portion being gripped. FIGS. 6A–6C show examples in which each heavy part of the camera such as a battery B, a capacitor c, or a motor M is disposed at the center in the camera body to ensure a preferred lateral weight balance.

What is claimed is:

1. A camera comprising:
    a grip portion for right-handed users and a grip portion for left-handed users provided respectively on right and left sides of a camera body;
    an operating member for right-handed users to be operated while gripping the grip portion for right-handed users;
    an operating member for left-handed users to be operated while gripping the grip portion for left-handed users;
    a switching mechanism for selectively enabling either one of said operating member for right-handed users and said operating member for left-handed users, wherein:
        said switching mechanism includes a switching operation member to be operated in opposing first and second directions, and said operating member for right-handed users is enabled when said switch operating member is operated in the first direction, whereas said operating member for left-handed users is enabled when said switching operation member is operated in said second direction;
        said first direction is an operating direction toward said operating member for right-handed users and said second direction is an operating direction toward said operating member for left-handed users;
        said switching mechanism further comprises a blocking member for disabling said operating member for left-handed users when said switching operation member is operated in the first direction and for disabling said operating member for right-handed users when said switching operation member is operated in the second direction; and
        said blocking member covers said operating member for left-handed users when said switching operation member is operated in said first direction, and covers said operating member for right-handed users when said switching operation member is operated in said second direction.

2. A camera as set forth in claim 1, wherein said switching mechanism further includes a power switch interlocked with said switching operation ember, and said power switch takes a first state to output electrical signals corresponding to an operation of said operating member for right-handed users and to prohibit an output of any electrical signal corresponding to an operation of the operating member for left-handed users when said operating member for right-handed users is operated under the situation where the switching operation member has been operated in the first direction, whereas the power switch takes a second state to output electrical signals corresponding to the operation of said operating member for left-handed users and to prohibit an output of any electrical signal corresponding to an operation of said operating member for right-handed users when said operating member for left-handed users is operated under the situation where said switching operation member has been operated in the second direction.

3. A camera as set forth in claim 1, wherein said camera further comprises a view finder provided between said operating member for right-handed users and the operating member for left-handed users.

4. A camera as set forth in claim 1, wherein at least one of a battery, a capacitor and a motor is arranged between said operating members for right-handed users and left-handed users to ensure that a weight balance of said camera becomes substantially equal when both right-handed users and left-handed users grip said camera.

5. camera comprising:
    a grip portion for right-handed users and a grip portion for left-handed users provided respectively on right and left sides of a camera body;
    an operating member for right-handed users to be operated while gripping the grip portion for right-handed users;
    an operating member for left-handed users to be operated while gripping the grip portion for left-handed users;
    a switching mechanism for selectively enabling either one of said operating member for right-handed users and said operating member for left-handed users, wherein:
        said switching mechanism includes a switching operation member to be operated in opposing first and second directions, and said operating member for right-handed users is enabled when said switch operating member is operated in the first direction, whereas said operating member for left-handed users is enabled when said switching operation member is operated in said second direction; and
        said switching operation member is fixed with a flash unit so that it moves toward said operating member for left-handed users when said switching operation member is operated in the first direction and moves toward said operating member for right-handed users when said switching operation member is operated in the second direction.

6. A camera comprising:
    a grip portion for right-handed users and a grip portion for left-handed users provided respectively on right and left sides of a camera body;
    an operating member for right-handed users to be operated while gripping the grip portion for right-handed users;
    an operating member for left-handed users to be operated while gripping the grip portion for left-handed users;

a switching mechanism for selectively enabling either one of said operating member for right-handed users and said operating member for left-handed users, wherein:
said switching mechanism includes a switching operation member to be operated in opposing first and second directions;
said operating member for right-handed users is enabled when said switch operating member is operated in the first direction, whereas said operating member for left-handed users is enabled when said switching operation member is operated in said second direction; and
said switching operation member is a ring member rotatably mounted about a lens-barrel.

7. A camera comprising:
a grip portion for right-handed users and a grip portion for left-handed users provided respectively on right and left sides of a camera body;
an operating member for right-handed users to be operated while gripping the grip portion for right-handed users;
an operating member for left-handed users to be operated while gripping the grip portion for left-handed users;
a switching mechanism for selectively enabling either one of said operating member for right-handed users and said operating member for left-handed users, wherein:
said switching mechanism includes a switching operation member to be operated in opposing first and second directions, and said operating member for right-handed users is enabled when said switch operating member is operated in the first direction, whereas said operating member for left-handed users is enabled when said switching operation member is operated in said second direction;
said first direction is an operating direction toward said operating member for right-handed users and said second direction is an operating direction toward said operating member for left-handed users;
said switching mechanism further comprises a blocking member for disabling said operating member for left-handed users when said switching operation member is operated in the first direction and for disabling said operating member for right-handed users when said switching operation member is operated in the second direction, and
said switching operation member is a ring member rotatably mounted about a lens-barrel and includes said blocking member integrally formed therewith.

8. A camera comprising:
a grip portion for right-handed users and a grip portion for left-handed users provided respectively on right and left sides of a camera body;
an operating member for right-handed users to be operated while gripping said grip portion for right-handed users;
an operating member for left-handed users to be operated while gripping said grip portion for left-handed users;
a switching operation member to be operated in first and second directions for selectively enabling either one of said operating member for fight-handed users and said operating member for left-handed users; and
prohibiting means interlocked with a switching operation of said switching operation member for prohibiting operation of either one of the operating member for right-handed users and the operating member for left-handed users that is not selected.

9. A camera as set forth in claim 8, wherein said prohibiting means includes a blocking member for disabling said operating member for left-handed users when said switching operation member is operated in the first direction, and disabling said operating member for right-handed users when said switching operation member is operated in the second direction.

10. A camera as set forth in claim 9, wherein said first direction is an operating direction toward said operating member for right-handed users and said second direction is an operating direction toward said operating member for left-handed users.

11. A camera as set forth in claim 9, wherein said switching operation member is a ring member rotatably mounted about a lens-barrel and includes said blocking member integrally formed therewith.

12. A camera as set forth in claim 9, wherein said blocking member covers said operating member for left-handed users when said switching operation member is operated in said first direction, and covers said operating member for right-handed users when said switching operation member is operated in said second direction.

13. A camera as set forth in claim 8, wherein said prohibiting means includes a power switch interlocked with said switching operation member, and said power switch takes a first state to output electrical signals corresponding to an operation of said operating member for fight-handed users when said operating member for right-handed users is operated under the situation where the switching operation member has been operated in the first direction, whereas the power switch takes a second state to output electrical signals corresponding to an operation of said operating member for left-handed users when said operating member for left-handed users is operated under the situation where said switching operation member has been operated in the second direction.

14. A camera as set forth in claim 13, wherein said first direction is an operating direction toward said operating member for right-handed users and said second direction is an operating direction toward said operating member for left-handed users.

15. A camera as set forth in claim 8, wherein said switching operation member is fixed with a flash unit so that it moves toward said operating member for right-handed users when said switching operation member is operated in the first direction and moves toward said operating member for left-handed users when said switching operation member is operated in the second direction.

16. A camera as set forth in claim 8, wherein said camera further comprises a view finder disposed between said operating member for right-handed users and said operating member for left-handed users.

17. A camera as set forth in claim 8, wherein at least one of a battery, a capacitor and a motor is arranged between said operating members for right-handed users and for left-handed users to ensure that a weight balance of said camera becomes substantially equal when both right-handed users and left-handed users grip said camera.

18. A camera as set forth in claim 8, wherein said switching operation member is a ring member rotatably mounted about a lens-barrel.

19. A camera comprising:
a grip portion for right-handed users and a grip portion for left-handed users provided respectively on right and left sides of a camera body;
an operating member for right-handed users to be operated while gripping the grip portion for right-handed users;

an operating member for left-handed users to be operated while gripping the grip portion for left-handed users;

a switching mechanism that selectively enables either one of said operating member for right-handed users and said operating member for left-handed users, wherein:

said switching mechanism further comprises a switching operation member provided between said operating members for right-handed users and for left-handed users, said switching operation member is operable at least at three positions including a neutral position, a right-handed users' position and a left-handed users' position, and said right-handed users position and left-handed users position are arranged symmetrically with respect to said neutral position, said neutral position being at a center of the camera in a lateral direction of the camera.

20. A camera as set forth in claim 19, wherein said camera is in an off state to disable said operating members when said operable member is at said neutral position.

21. A camera as set forth in claim 19, wherein said switching mechanism comprises a blocking member for physically disabling either one of said operating members for left-handed users and for right-handed users.

* * * * *